United States Patent
Cai et al.

(10) Patent No.: US 10,635,677 B2
(45) Date of Patent: *Apr. 28, 2020

(54) HIERARCHICAL ENTITY INFORMATION FOR SEARCH

(71) Applicant: Microsoft Technology Licensing, LLC, Redmond, WA (US)

(72) Inventors: Jie Cai, Sunnyvale, CA (US); Ciya Liao, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 551 days.

This patent is subject to a terminal disclaimer.

(21) Appl. No.: 15/452,932

(22) Filed: Mar. 8, 2017

(65) Prior Publication Data

US 2017/0177587 A1 Jun. 22, 2017

Related U.S. Application Data

(63) Continuation of application No. 13/903,984, filed on May 28, 2013, now Pat. No. 9,633,080.

(51) Int. Cl.
*G06F 16/185* (2019.01)
*G06F 16/2457* (2019.01)
(Continued)

(52) U.S. Cl.
CPC ...... *G06F 16/24578* (2019.01); *G06F 16/185* (2019.01); *G06F 16/288* (2019.01);
(Continued)

(58) Field of Classification Search
CPC .................................................. G06F 16/185
See application file for complete search history.

(56) References Cited

U.S. PATENT DOCUMENTS 8,140,578 B2  3/2012 Johnson et al.
2005/0240557 A1  10/2005 Rorex et al.
(Continued)

FOREIGN PATENT DOCUMENTS

CN  1902912 A  1/2003
CN  1389783 A  1/2007
(Continued)

OTHER PUBLICATIONS

US 5,839,701 A1, 01/2005, Baer et al. (withdrawn)
(Continued)

*Primary Examiner* — Ajith Jacob

(57) ABSTRACT

A fast browsing architecture for exploring hierarchical lists of entities through a search user interface. A graphical UI operates to handle the hierarchical lists and sub-lists in different ways for different scenarios such as a hierarchical level is zero (only one list of entities associated with a query and the list cannot be further drilled down), a second scenario where the hierarchical level is one (a list of entities associated with the query and these entities can be further drilled down to a number of sub-lists) and the sub-lists cannot be further drilled down, and a third scenario where the hierarchical level is more than one (a list of entities associated with the query and these entities can be further drilled down to a number of sub-lists), sub-lists can be further drilled down to a number of lists, until there is no more drill down lists to be found.

20 Claims, 13 Drawing Sheets

(51) Int. Cl.
G06F 16/28 (2019.01)
G06F 16/904 (2019.01)
G06F 16/903 (2019.01)
G06F 3/0482 (2013.01)
G06F 3/0485 (2013.01)
G06F 3/0488 (2013.01)

(52) U.S. Cl.
CPC ...... *G06F 16/904* (2019.01); *G06F 16/90348* (2019.01); *G06F 3/0482* (2013.01); *G06F 3/0485* (2013.01); *G06F 3/04883* (2013.01)

(56) References Cited

U.S. PATENT DOCUMENTS

2008/0010273 A1 1/2008 Frank
2012/0047135 A1 2/2012 Hansson et al.

FOREIGN PATENT DOCUMENTS

CN 102207960 A 10/2011
CN 102968440 A 3/2013

OTHER PUBLICATIONS

"First Office Action and Search Report Issued in Chinese Patent Application No. 201480030685.2", dated Mar. 28, 2018, 13 Pages.
"Final Office Action Issued in U.S. Appl. No. 13/903,984", dated May 19, 2016, 10 Pages.
"Non Final Office Action Issued in U.S. Appl. No. 13/903,984", dated Sep. 25, 2015, 11 Pages.
"Notice of Allowance Issued in U.S. Appl. No. 13/903,984", dated Dec. 19, 2016, 8 Pages.
"Notice of Allowance Issued in U.S. Appl. No. 13/903,984", dated Feb. 14, 2017, 10 Pages.
Bautin, et al., "Concordance-Based Entity-Oriented Search", In Proceedings of the IEEE/WIC/ACM International Conference on Web Intelligence, Nov. 2, 2007, pp. 586-592.
Cui, et al., "Hierarchical Structural Approach to Improving the Browsability of Web Search Engine Results", In Proceedings of the 12th International Workshop on Database and Expert Systems Applications, Sep. 3, 2001, 5 Pages.
Duke, et al., "Squirrel: An Advanced Semantic Search and Browse Facility", In Proceedings of the 4th European Semantic Web Conference, Jun. 3, 2007, 15 Pages.
Kuang, et al., "A New Search Engine Integrating Hierarchical Browsing and Keyword Search", In Proceedings of the 22nd International Joint Conference on Artificial Intelligence, Jul. 16, 2011, 6 Pages.
"International Preliminary Report on Patentability Issued in PCT Application No. PCT/US2014/039478", dated Nov. 6, 2015, 9 Pages.
"International Search Report and Written Opinion Issued in PCT Application No. PCT/US2014/039478", dated Sep. 3, 2014, 8 Pages.
Toda, et al., "A Search Result Clustering Method using Informatively Named Entities", In Proceedings of the 7th Annual ACM International Workshop on Web Information and Data Management, Nov. 5, 2005, 6 Pages.
"Summons to Attend Oral Proceedings Issued in European Patent Application No. 14734619.1", dated Mar. 15, 2019, 10 Pages.
"Third Office Action Issued in Chinese Patent Application No. 201480030685.2", dated Apr. 26, 2019, 5 Pages.
"Second Office and Search Report Action Issued in Chinese Patent Application No. 201480067158.9", dated Nov. 2, 2018, 16 Pages.

| QUERY | TYPE | SUB-LISTS | ENTITY INTENT-1 | ENTITY INTENT-2 |
|---|---|---|---|---|
| $QUERY_1$ | LIST OF $ENTITIES_1$ | N/A | $ENTITY_{1\text{-}1}$<br>-$ID_{1\text{-}1}$<br>-$RELEVANCE_{1\text{-}1}$<br>-$PROBABILITY_{1\text{-}1}$<br>-$QUERY_{1\text{-}1}$ | $ENTITY_{1\text{-}2}$<br>-$ID_{1\text{-}2}$<br>-$RELEVANCE_{1\text{-}2}$<br>-$PROBABILITY_{1\text{-}2}$<br>-$QUERY_{1\text{-}2}$ |
| $QUERY_2$ | LIST OF $ENTITIES_2$ | SUB-LIST $ITEM_{2\text{-}1}$ + CS<br><br>SUB-LIST $ITEM_{2\text{-}3}$ + CS<br><br>SUB-LIST $ITEM_{2\text{-}3}$ + CS<br>⋮ | N/A | N/A |
| $QUERY_3$ | LIST OF $ENTITIES_3$ | N/A | $ENTITY_{3\text{-}1}$<br>-$ID_{3\text{-}1}$<br>-$RELEVANCE_{3\text{-}1}$<br>-$PROBABILITY_{3\text{-}1}$<br>-$QUERY_{3\text{-}1}$ | $ENTITY_{3\text{-}2}$<br>-$ID_{3\text{-}2}$<br>-$RELEVANCE_{3\text{-}2}$<br>-$PROBABILITY_{3\text{-}2}$<br>-$QUERY_{3\text{-}2}$ |
| ⋮ | ⋮ | ⋮ | ⋮ | ⋮ |

*FIG. 2*

HIERARCHICAL ENTITY INFORMATION FOR SEARCH

RELATED APPLICATIONS

This application is related to and claims priority to U.S. Non-Provisional patent application Ser. No. 13/903,984 filed on May 28, 2013, and entitled "Hierarchical Entity Information for Search," which is hereby incorporated by reference in its entirety.

BACKGROUND

Users oftentimes search for entity lists through a search engine. However, when the list of entities is large, the required time to find a specific entity can be long, which introduces a particularly bad experience for the user. In addition, users oftentimes seek recommendations from the search engine, but the recommendations are not handled well thereby further exacerbating the user experience.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a fast browsing technique for exploring hierarchical lists of entities through a user interface and supports backend entity resolution pipeline. This solves a problem of easy access and fast browse through hierarchical list of entities in both touch screen based search applications and traditional search engine webpages.

With respect to fast browsing, a graphical UI is disclosed that operates to handle the hierarchical lists and sub-lists in different ways for different scenarios. In a first scenario, where the hierarchical level is zero (which means given a query, there is only one list of entities associated with it and the list cannot be further drilled down), after the search engine returns the list of entities, these entities are displayed (e.g., as a horizontal arch of ranked entities by relevance). New entities can be browsed interactively (e.g., by a touch swipe on a touch screen).

In a second scenario, where the hierarchical level is one (which means that given a query, there is a list of entities associated with it and these entities can be further drilled down to a number of sub-lists), the sub-lists cannot be further drilled down. After the search engine returns the sub-lists, these sub-lists are displayed (e.g., in a vertical column) ranked by relevance/popularity to the query. In response to user selection of a sub-list, the entities belonging to the sub-list are displayed in the manner of the list of entities for the above hierarchical level of zero (e.g., horizontally as an arch).

In a third scenario, where the hierarchical level is more than one (which means that given a query, there is a list of entities associated with it and these entities can be further drilled down to a number of sub-lists), one of more of these sub-lists can be further drilled down to a number of lists, and so on, until there is no more drill down lists to be found. After the search engine returns the sub-lists, the sub-lists are displayed (e.g., in a vertical style) ranked by relevant/popularity to the query. In response to user selection of one sub-list, the further drilled down lists are displayed for the selection (sub-list), until the selected list cannot be further drilled down. The entities belonging to this final drill down and selected list are displayed (e.g., in a horizontal style).

Additionally, a scalable approach is disclosed to generate both a list of entity queries and the entities that belong to these lists cross all entity domains. The data structure facilitates fast and iterative retrieval of sub-lists of entities.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 2 illustrates the data structure that provides query to list and sub-list relationships.

DETAILED DESCRIPTION

Figure 1:
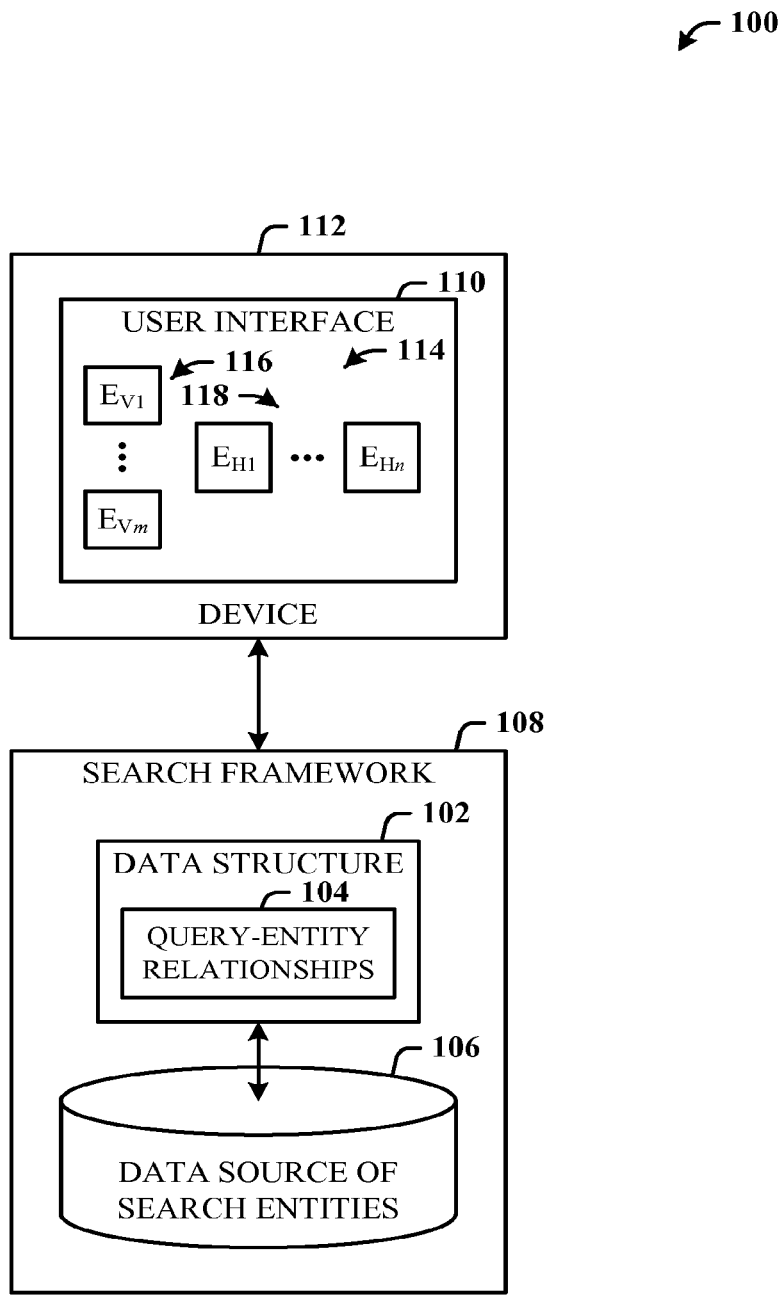
FIG. 1 illustrates a system in accordance with the disclosed architecture.

The disclosed architecture provides a fast browsing technique to explore hierarchical lists of entities through a user interface (UI) and backend entity resolution pipeline. Additionally, the architecture is scalable as to the generation of entity lists and drill down of the lists. As defined herein, an entity has a distinct, separate existence, and includes, but is not limited to, a person (e.g., "Actor <name>"), a movie, a restaurant, an event, a book, a song, an album, or a place of interest, for example. Each entity has an identifying name and a set of attributes that describe the entity. A list of entities specifies the entities by category or condition (e.g., "action movies", and "top 2012 movies"). The list of entities can be further expanded ("drilled down" into) to sub-lists based on a common condition. For example, the list of entities "top 2012 movies" can be drilled down by "movie genre", for example, which is a common attribute for each entity contained in the list. Using the above example of categories "action movies" and "top 2012 movies", a drilled down sub-list can be "top 2012 action movies".

The architecture provides a technique for fast browsing hierarchical lists of entities, and resolution of lists and drill down lists of entities in a search engine when given a query.

With respect to fast browsing, a graphical UI is disclosed that operates to handle the hierarchical lists and sub-lists in different ways for different scenarios. In a first scenario, where the hierarchical level is zero (which means given a query, there is only one list of entities associated with it and the list cannot be further drilled down), after the search engine returns the list of entities, these entities are displayed (e.g., as a horizontal arch of ranked entities by relevance). New entities can be browsed interactively (e.g., by a touch swipe on a touch screen).

In a second scenario, where the hierarchical level is one (which means that given a query, there is a list of entities associated with it and these entities can be further drilled down to a number of sub-lists), the sub-lists cannot be further drilled down. After the search engine returns the sub-lists, these sub-lists are displayed (e.g., in a vertical column) ranked by relevance/popularity to the query. In response to user selection of a sub-list, the entities belonging to the sub-list are displayed in the manner of the list of entities for the above hierarchical level of zero (e.g., horizontally as an arch).

In a third scenario, where the hierarchical level is more than one (which means that given a query, there is a list of entities associated with it and these entities can be further drilled down to a number of sub-lists), one of more of these sub-lists can be further drilled down to a number of lists, and so on, until there is no more drill down lists to be found. After the search engine returns the sub-lists, the sub-lists are displayed (e.g., in a vertical style) ranked by relevant/popularity to the query. In response to user selection of one sub-list, the further drilled down lists are displayed for the selection (sub-list), until the selected list cannot be further drilled down. The entities belonging to this final drill down and selected list are displayed (e.g., in a horizontal style).

Additionally, a scalable approach is disclosed to generate both a list of entity queries and the entities that belong to these lists cross all entity domains. The data structure facilitates fast and iterative retrieval of sub-lists of entities.

More specifically, the scalable approach utilizes an entity knowledge base of a search engine to create an offline "domain-entity-top attributes" lookup table. For each entity domain (e.g., level zero domain) such as "movie", for example, top common attributes are extracted for all of the entities included in the domain, such as "genre", "year", "actor" and "director", etc., for the "movie" domain. A combination of different top attributes of a domain can be utilized to construct a list of entities query and drill down list of entities. For example, combining "genre" and "actor" can construct a list of entities such as like "<actor> action movie"; combining "genre" and "year" can construct list of entities like "2012 action movies". Combining "genre" and "director" and "year" can construct a list of entities such as "<director name> 2012 SciFi movies". These sub-lists are also queries that can be mined (extracted) from search engine logs.

The fast lookup table implemented (a query-to-entities lookup table hosted by a search engine) facilitates fast access of different lists of entities and drill down list of entities. Queries are indexed to facilitate fast access time, which supports constant access time for each individual lookup. When a list of entities contains a sub-list, the sub-lists are compiled with relevance and confidence. The sub-lists can also be sub-category queries. To access a particular sub-list includes two portions of constant time: finding the sub-list, and using the sub-list as a new query to find additional lists of entities. The time spent on a lookup is proportional to the number of hierarchical lists of entities.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a data structure 102 of lists of entities of query and entity relationships 104 extracted from a search entity data source 106 (e.g., Satori™ of Microsoft Corporation, a graph-based knowledge base repository). The data structure 102 includes different levels of hierarchy (e.g., zero, one, two, etc.). The data structure 102 and data source 106 can be part of a search framework 108 such as for web searching. A search user interface (UI) 110 of a device 112 enables browsing of the lists of entities of the data structure 102 as related to a specific query. The search UI 110 can be a gesture-based UI that enables gesture interaction with visual elements ($E_1, \ldots E_n$) 114 as well as device operation (e.g., power on/off, page navigation, etc.), in general.

The visual elements 114 can be presented for suitable viewing and user interaction on a small touch-based device. For example, there can be a set of vertical visual elements 116 (denoted $E_{V1}$-$E_{Vm}$) and horizontal visual elements 118 (denoted $E_{H1}$-$E_{Hn}$). The vertical visual elements 116 can be scrolled up or down to access lists of entities and the horizontal visual elements 118 can be scrolled left and right to access entities. In one implementation, the scrolling is accomplished by touch on a touch-sensitive display. In another implementation, the scrolling and interaction can be performed using non-tactile interaction such as speech and voice interaction, such as associated with natural user interface (NUI) techniques.

A NUI technology may be defined as any interface technology that enables a user to interact with a device in a "natural" manner, free from artificial constraints imposed by input devices such as mice, keyboards, remote controls, and the like. Examples of NUI methods include those methods that employ gestures, broadly defined herein to include, but not limited to, tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example.

NUI technologies include, but are not limited to, touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems, all of which provide a more natural user interface, as well as technologies for sensing brain activity using electric field sensing electrodes (e.g., electro-encephalograph (EEG)) and other neuro-biofeedback methods.

FIG. 2 illustrates the data structure 102 that provides query to list and sub-list relationships. The data structure, in this example, is lookup table 200 indexed by queries (rows) and columns of type (e.g., list of entities), sub-lists, and entity intent data (e.g., identifier (ID), relevance value, probability values, and query). Each query of the table 200 can have varying hierarchical levels of lists and sub-lists. The lookup table comprises queries and entity relationships, and is indexed by the queries. The data structure includes a list of entities having an entity sub-list. Not all queries have sub-lists and not all lists of entities have sub-lists—hence, the different hierarchical levels. In other words, a sub-list is compiled according to relevance and confidence data. The data structure 102 includes entity intent data for a given query. A given entity intent for a query includes an entity data, an entity identifier (ID), entity relevance data, entity probability data, and a related entity query.

The table can be a fast lookup table that employs segments, sub-segments, types, and definitions, for example. The segments can comprise general categories such as people, music, entertainment, local/map, generic hero, and so on. Sub-segments under people include actor, athlete, and general celebrity; sub-segments under music include artist, song, album, band; a sub-segment under entertainment can be move; sub-segments under local/map can include places, restaurant, hotel, attraction; and sub-segments under generic hero can comprise book, organizations, clubs, universities/colleges, schools, companies, organism classes, sports team, etc.

The types for actor can include film actor, TV actor, theater actor, and game voice actor. Types for athlete can include cyclist, golfer, soccer player, American football player, basketball player, baseball player, tennis player, ice hockey player, cricket player, and others. Types for general celebrity can include celebrity, noble person, military, politician, award winner, computer scientist, religion, writer, producer, director, editor, designer, artist, and chess player. Types under artist can include composer, singer, artist, instrument player, and others. These are just a few examples of entities that can be employed.

Figure 3:
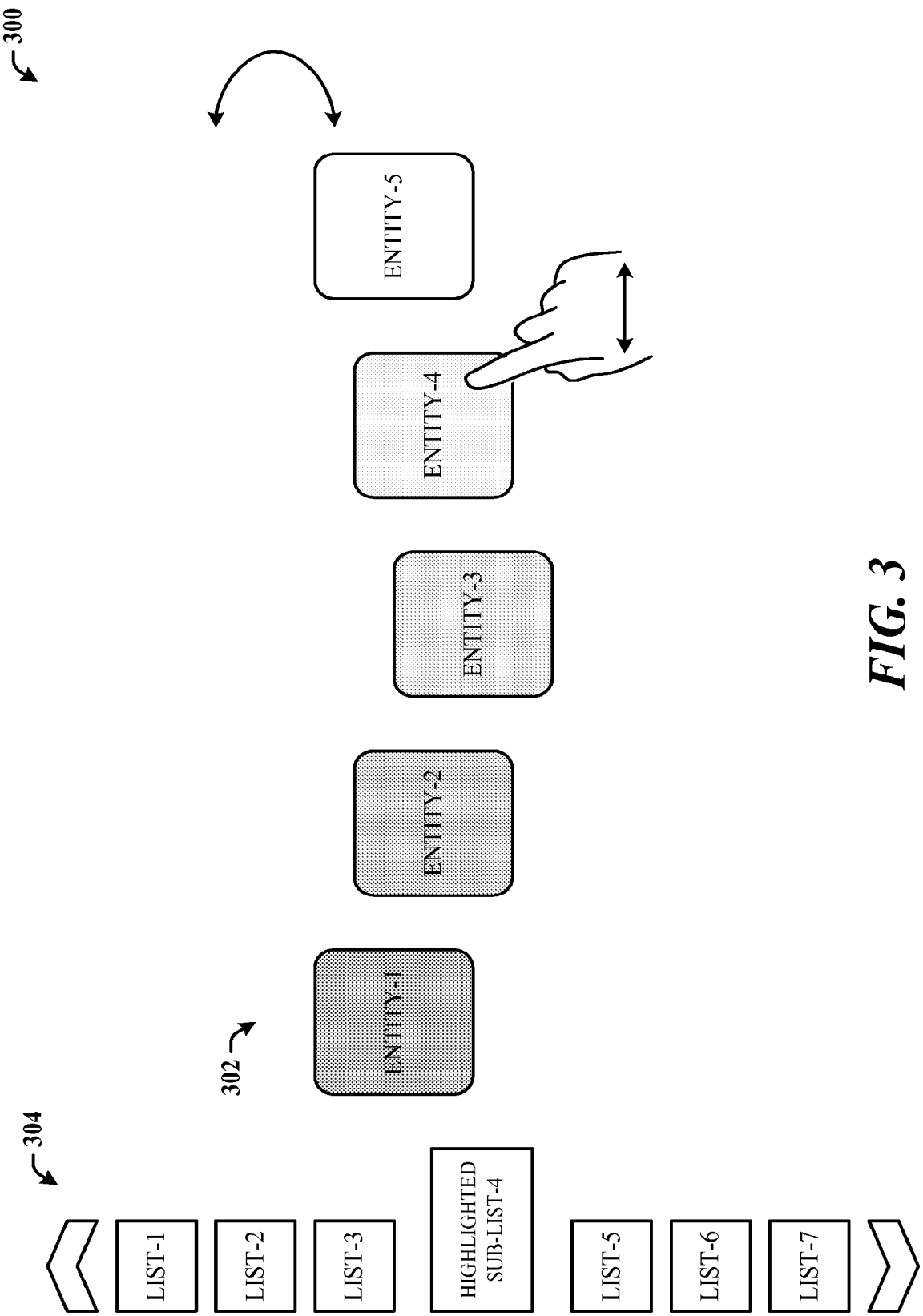
FIG. 3 illustrates an exemplary user interface for browsing hierarchical lists of entities.

FIG. 3 illustrates an exemplary user interface 300 for browsing hierarchical lists of entities. In this example implementation, the UI 300 enables user interaction according to a touch-based display. The UI 300 shows at least two styles of touch-based visual elements for interacting with entities and sub-lists. A horizontal row 302 of visual interactive elements (also referred to as entity elements) relates to entities that can satisfy a given query.

In this example UI 300, five entity elements are shown; whoever, it can be that additional entity elements will be generated entering the right side of the UI 300 as the user touch-scrolls the viewable five entities to the left. The set of five entity elements is designed to behave as a carousel (circular). That is, if there are five entities for the query, the row 302 will behave as a bi-directional ring of objects wherein the user can touch-scroll left or right (generally, gesture) through the entities to find the desired entity. Thus, of touch-scrolling is leftward, once the first entity (Entity-1) moves out of view on the left, it will be made to immediately reappear on the right, next to the fifth entity Entity-5. The same operation occurs when moving in the rightward touch-scroll motion.

Continuing with the five-entity example, the disclosed architecture also applied graphical emphasis to the visual elements (or objects) to represent rank or popularity. Here, the graphical emphasis can be a color gradient where the darker color indicates higher rank, and a lighter color indicates lower rank. In this example, the first entity (Entity-1) is ranked the highest, since it is the darkest color relative to the other four entities. Similarly, the fifth entity (Entity-5) is the lowest ranked since it is the lightest in color relative to the other four entities.

Graphical emphasis such as different colorations or a color gradient of a single color can be applied to visual elements (e.g., entities) to indicate rank, or popularity. For example, a leftmost entity element can be a full yellow color while a rightmost entity element can be a light yellow, thereby indicating the leftmost entity element as the highest ranked and the rightmost entity element as the lowest ranked, of the visible set of entity elements.

Alternatively, a size gradient can be employed such that the highest ranked entity (Entity-1) is the largest in element size of the five elements shown, and the least ranked of the five shown (Entity-5) is also the smallest in visual element size (relative to the other four), with the intermediate elements (Entity-2, Entity-3, and Entity-4) of decreasing size. Fading in and out can be employed for the end elements such that scrolling leftward, for example, forces the first entity (Entity-1) to fade out of view and a sixth entity (not shown) to fade into view on the right so that at least five elements are always in view.

Where there are more than five visual elements (for five corresponding entities), as the user scrolls left (or right), and new entities are exposed (come into view) on the right (or left), the relative colorations can be retained since the leftmost entity is still ranked highest among the other four entities. Similarly, the rightmost element coloration is retained since it is still the lowest ranked entity of the five shown. This applies equally to the use of the size gradient for the ranked elements described above. As a new entity is dragged into view on the right, the leftmost entity is removed from view, and the middle entities are re-associated with increasingly larger visual elements (to the left) to retain relative rank among the viewable entities.

The UI 300 also depicts a set of vertical interactive visual elements 304 that indicate the existence of lists of entities; however, if the hierarchical level is zero, there would not be a sub-list associated with the query, and there would not be presented the vertical sub-list elements 304. The user interface 110 displays an additional sub-list with a list currently presented when the sub-list is available.

Ranking can be applied to the vertical elements as well via a coloration gradient form the highest ranked to the lowest ranked (in view), element size gradients (top ranked is the largest, and the lowest ranked list element in view is the smallest), and so on. Touch-based scrolling can be employed in the vertical elements 304 as well that enables the user to move (navigate) over the ranked lists. Here, sub-list-4 is selected for the vertical elements 304, and accordingly, the associated entities for that sub-list-4 are then shown in the horizontal row 302 for user viewing and selection.

Put another way, the user interface 110 (and related software instructions and programs) enables gesture-based interaction (e.g., touch) to browse the lists of entities returned for the query. The user interface 110 enables drilldown of a list of entities using a sub-list as a new query to find a new list of entities. The user interface 110 presents the lists of entities in a ranked format and using graphical emphasis to indicate ranking. In other words, the ranking can be the most relevant or popular list on top of a vertical listing, and farthest to the left (or right) for the most relevant or highest ranked entity on a horizontal listing, while the least (or less ranked relatively) ranked is on the bottom of the vertical list and on the rightmost position of the horizontal row. This relative position of the elements in the vertical list continually represents the ranking as the user scrolls up and down the listing.

Figure 4:
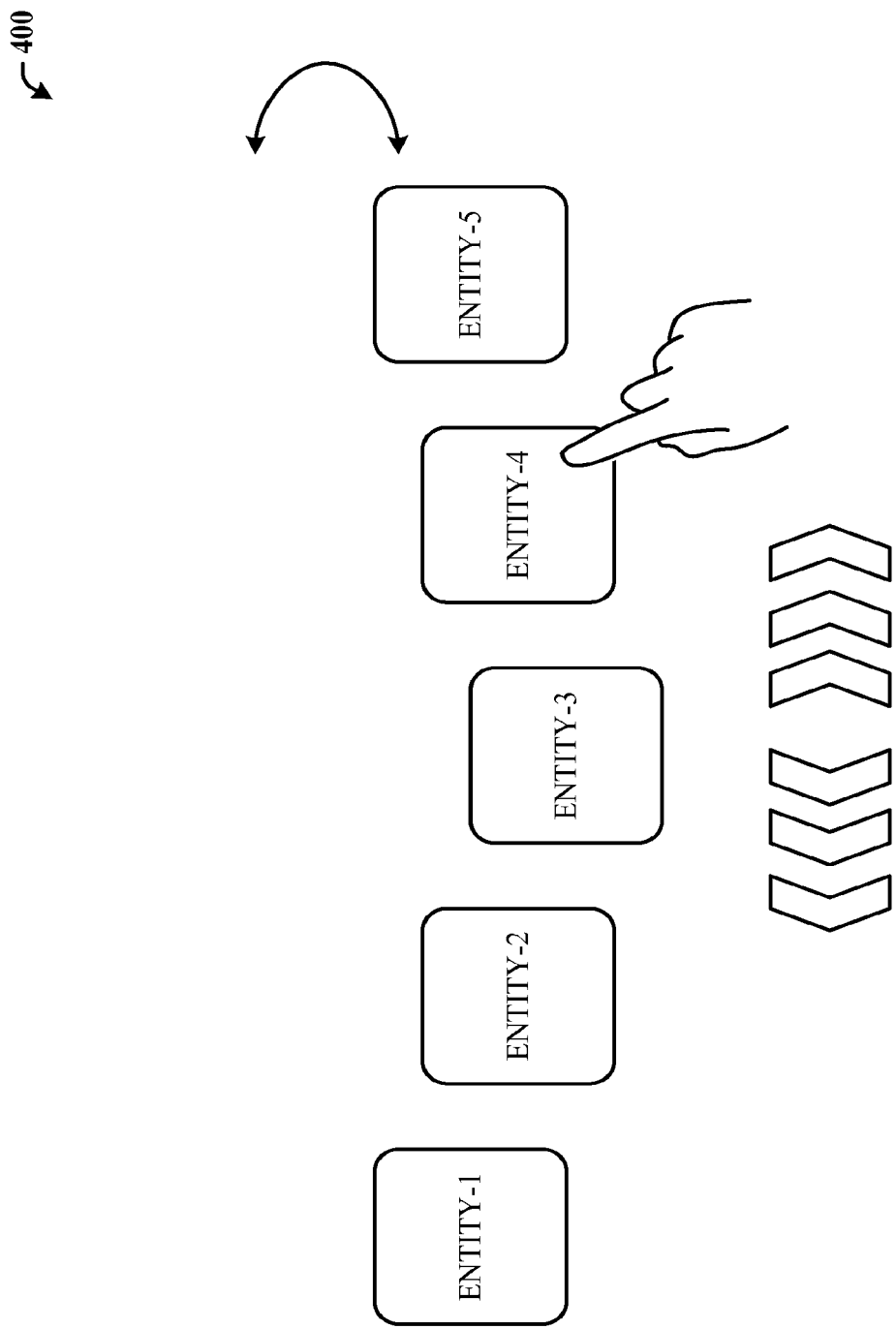
FIG. 4 illustrates a UI view when the hierarchical level is zero.

FIG. 4 illustrates a UI view 400 when the hierarchical level is zero. A hierarchical level of zero means given a query, there is only one list of entities associated with it and the list cannot be further drilled down. After search engine returned the list of entities, these entities are displayed in a horizontal arch (with the most relevant entity as Entity-1, the leftmost element, for example). The leftmost entity at the initial phase has the highest relevance to the query. New entities can be browsed by a "swipe" gesture (a continual touch motion on the display) from right to left.

Figure 5A:
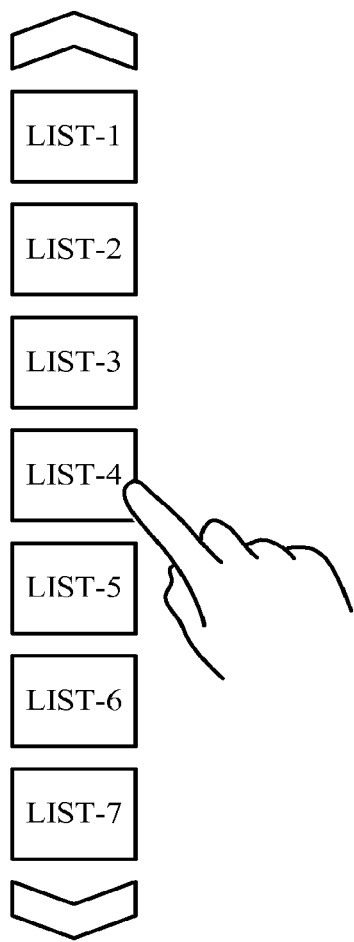
FIG. 5A and FIG. 5B illustrate a UI view when the hierarchical level is one and drilldown is enabled to the single level.
Figure 5B:
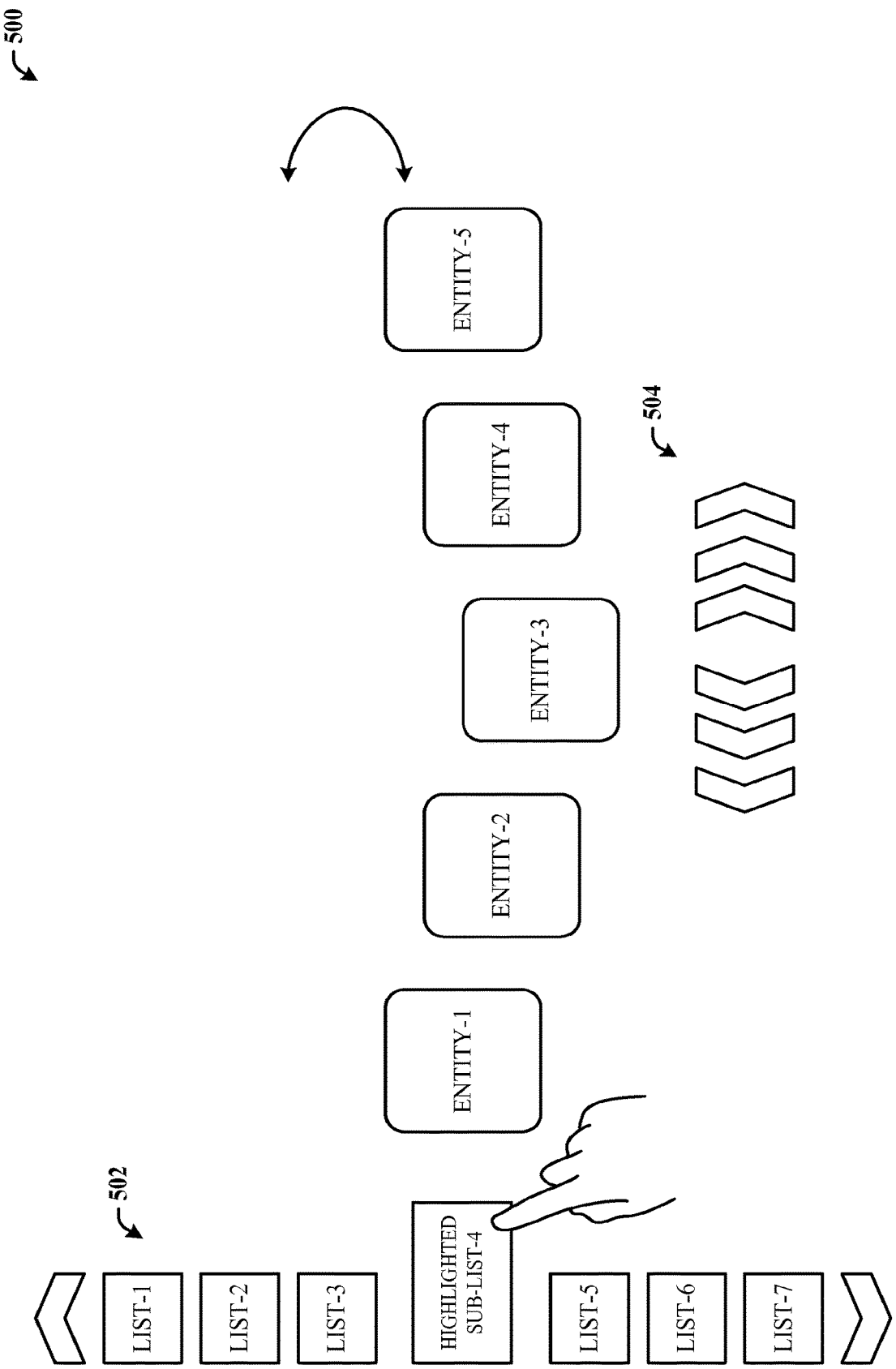

FIG. 5A and FIG. 5B illustrate a UI view 500 when the hierarchical level is one and drilldown is enabled to the single level. A hierarchical level of one means that given a query, there is a list of entities associated with it and these entities can be further drilled down to a number of sub-lists. These sub-lists cannot be further drilled down.

For this scenario, after the search engine returns the sub-lists, these sub-lists are displayed in a vertical style of list elements 502 which can be swiped (to scroll downward or upward) with a finger, as shown in FIG. 5A. The upper lists (e.g., List-1, List-2, List-3) are more relevant/popular to the query than the lower lists (e.g., List-5, List-6, List-7). After a user selects a list element of sub-list, List-4, entities belonging to this list are displayed in the horizontal style in an arch, as shown in FIG. 5B. The lower chevrons 504 indicate the swipe action can be employed for left and right scrolling over the entities for that sub-list-4. The vertical list 502 can be designed for a drag-and-drop operation such that the user can move the vertical list 502 to a desired location on the display. This capability can also be provided for the horizontal arch of entities.

Figure 6A:
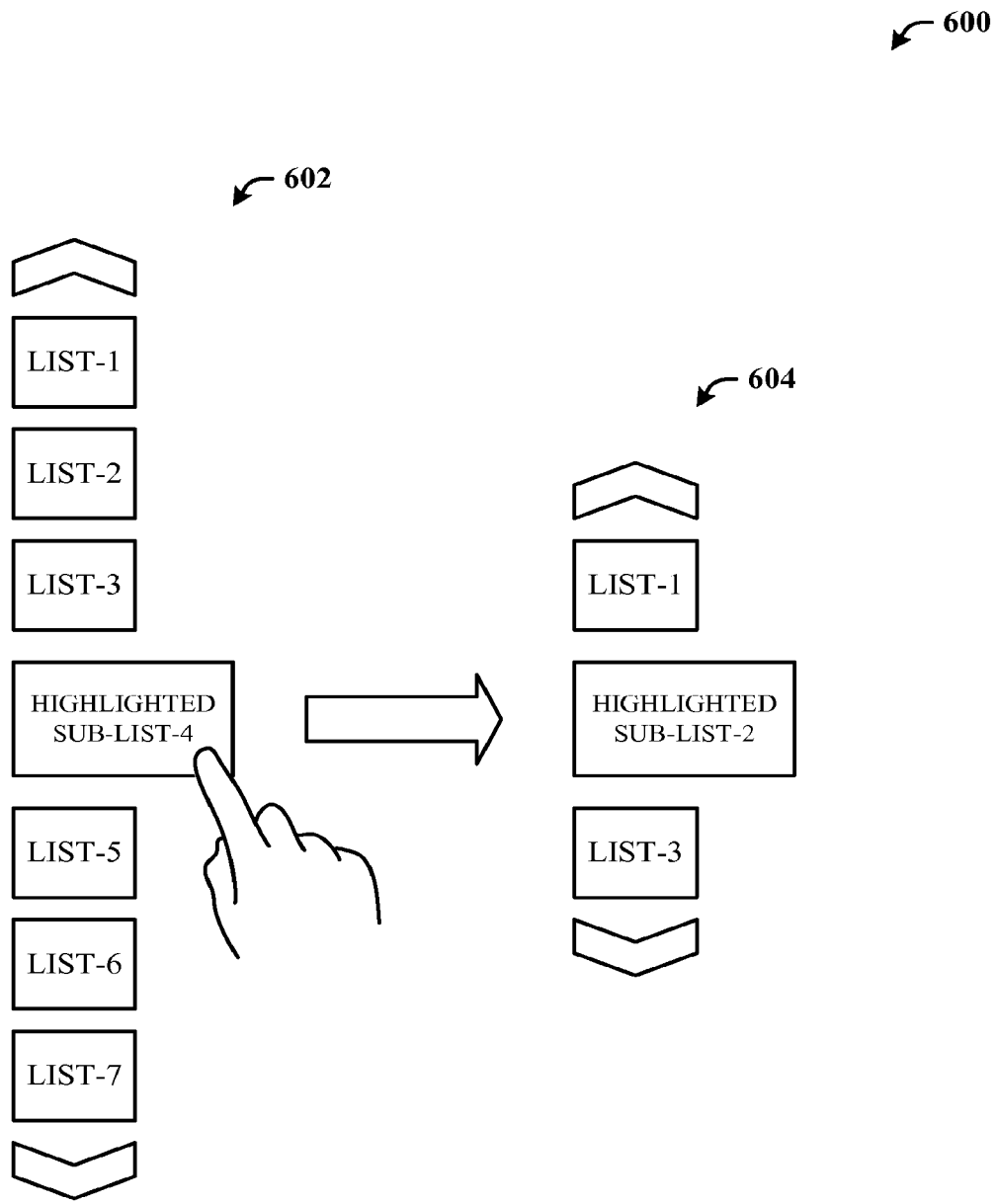
FIG. 6A and FIG. 6B illustrate a UI view when the hierarchical level is more than one and drilldown is enabled to the more than one level.
Figure 6B:
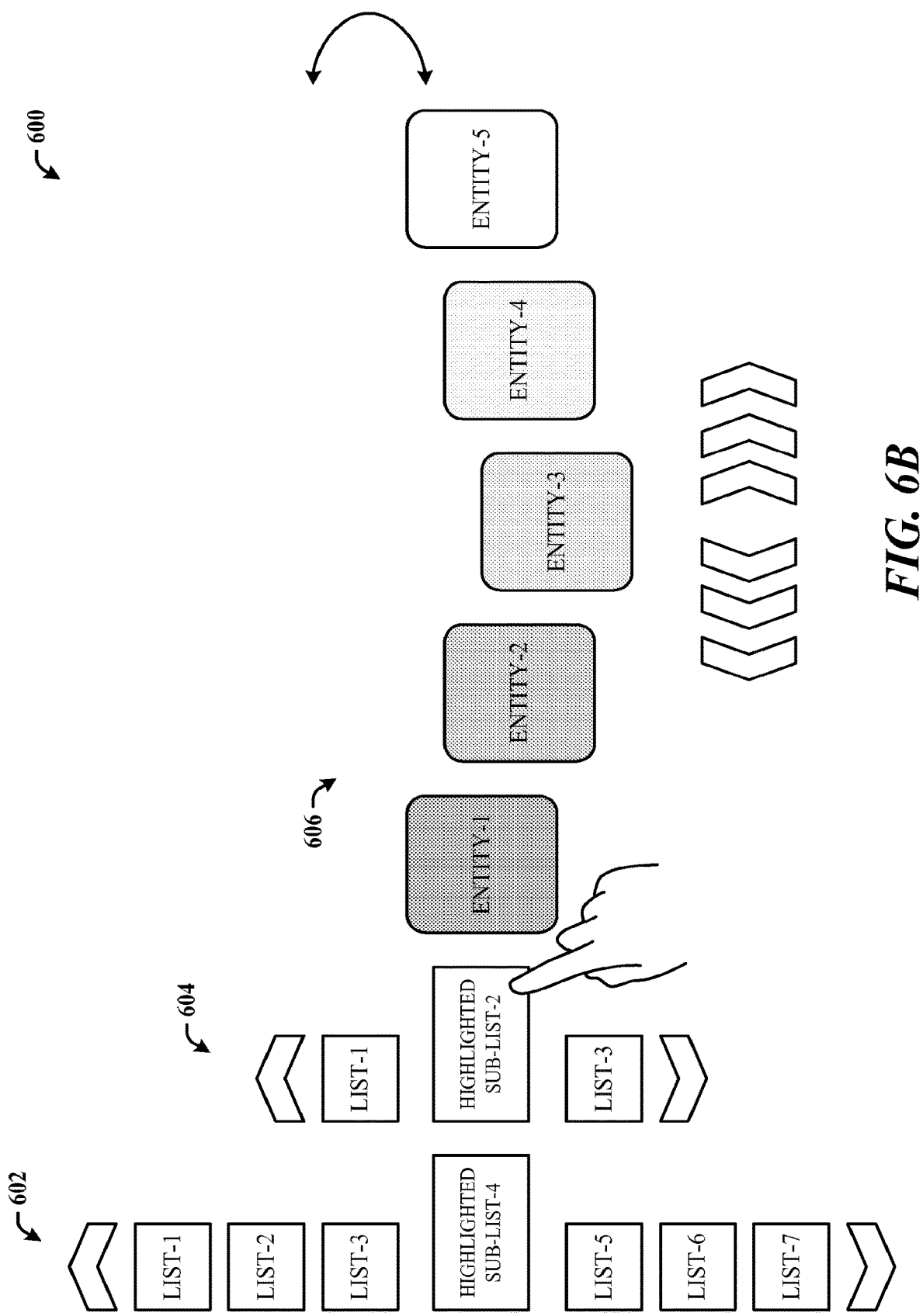

FIG. 6A and FIG. 6B illustrate a UI view 600 when the hierarchical level is more than one and drilldown is enabled to the more than one level. A hierarchical level is more than one means that given a query, there is a list of entities associated with it and these entities can be further drilled down to a number of sub-lists. One or more of these sub-lists can be further drilled down (selected to expose other sub-lists), and so on, until there are no more drill down lists.

For this scenario, after the search engine returns the sub-lists, these sub-lists are displayed in a vertical style of list elements 602 which can be swiped with a finger (to scroll upward and downward), as shown in FIG. 6A. The upper lists (e.g., List-1, List-2, List-3) are more relevant/popular to the query than the lower lists (e.g., List-5, List-6, List-7). After the user has selected one sub-list (Sub-list-4), additional lists are displayed in a vertical list of elements 604 for drill down. This continues until there are no more sub-list levels. In FIG. 6B, the entities 606 belonging to this final drilled down and selected sub-list (Sub-list-2) are displayed in the horizontal arch style.

For a device having more limited display area, the vertical lists (602 and 604) can be presented centered on the display, in the background after selecting the Sub-list-2, and the final horizontal entities 606 in the foreground.

Figure 7:
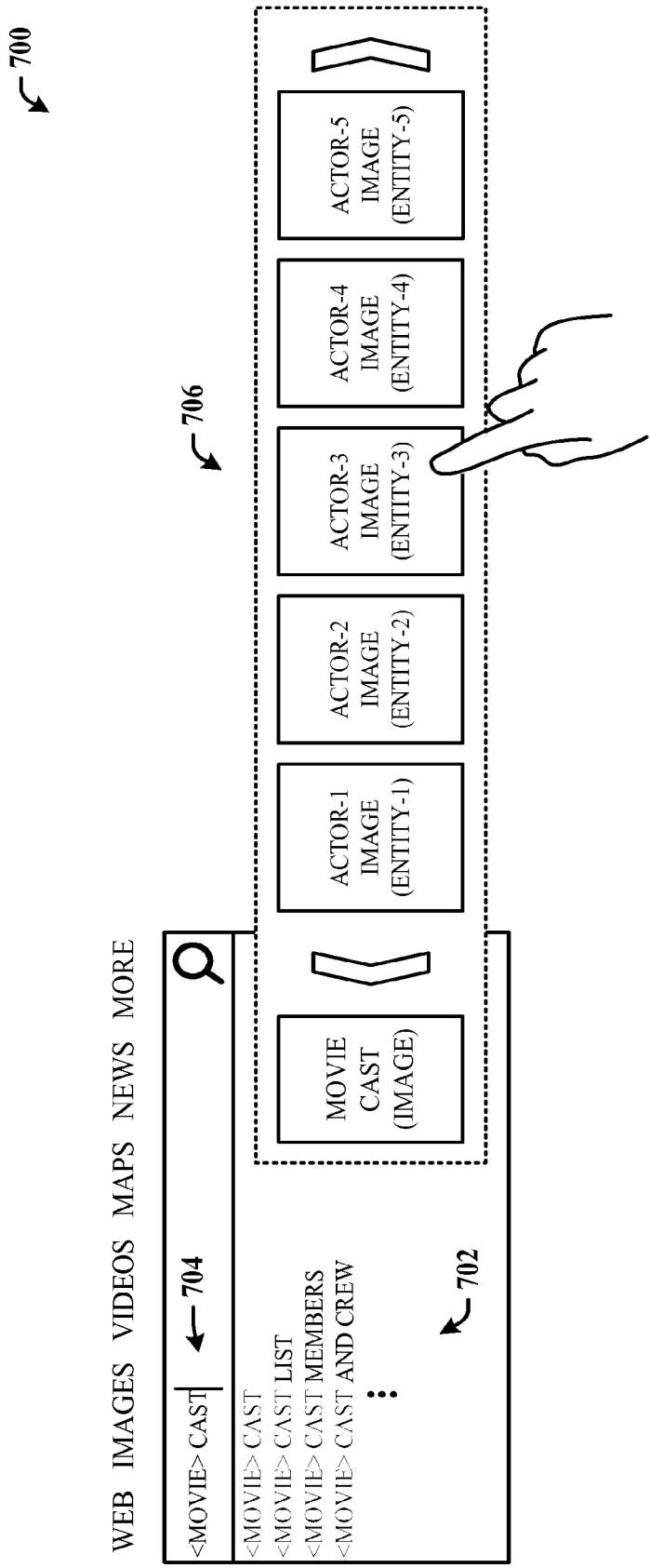
FIG. 7 illustrates a user interface view of a search engine home page with automatic query suggestions as a list of entities in accordance with the disclosed architecture.

FIG. 7 illustrates a user interface view 700 of a search engine home page with automatic query suggestions as a list of entities in accordance with the disclosed architecture. Here, a vertical list of elements 702 is presented and the element 704 associated with "<movie> cast" is selected, thereby resulting in a bi-directionally scrollable carousel of entities 706 (e.g., Actor-1, Actor-2, Actor-3, etc.) being presented that the user can peruse using one or more gestures (e.g., touch).

Figure 8:
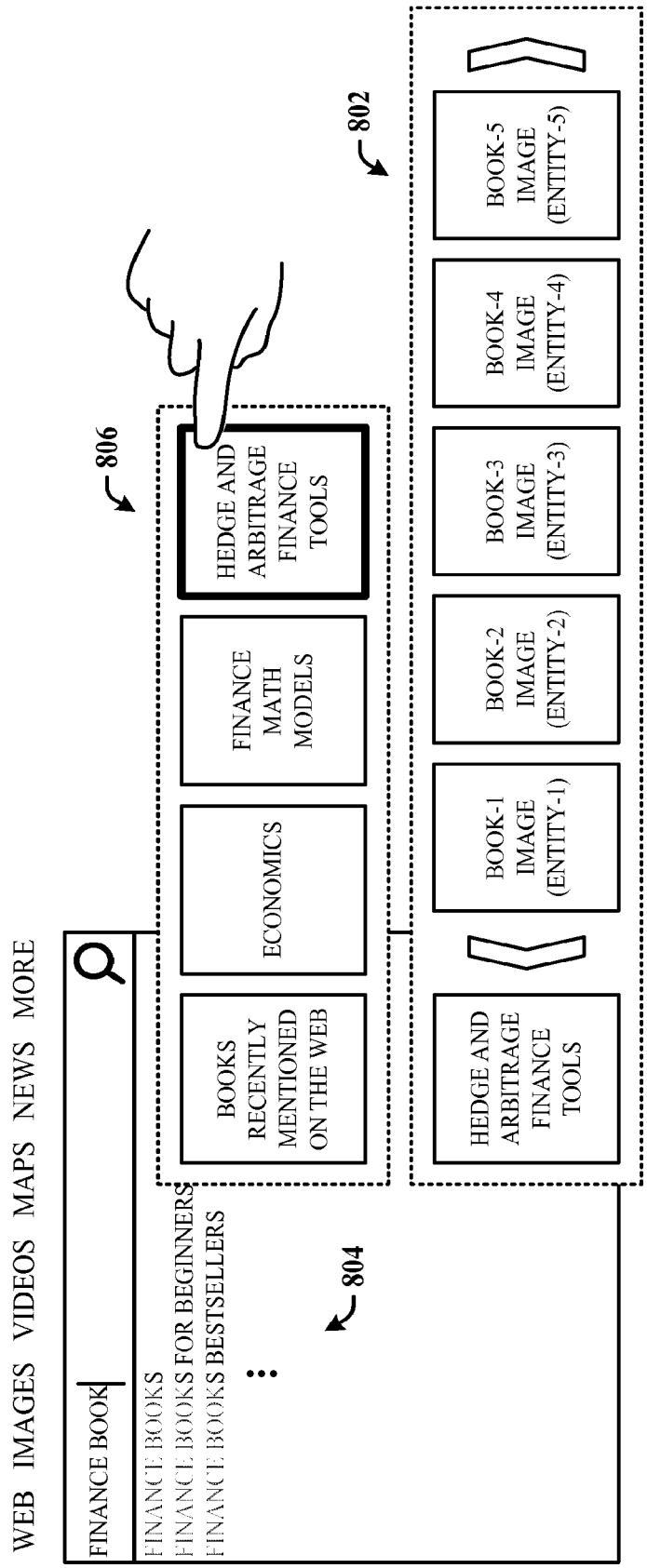
FIG. 8 illustrates a user interface view of a search engine home page with automatic query suggestions that include a sub-list of entities in accordance with the disclosed architecture.

FIG. 8 illustrates a user interface view 800 of a search engine home page with automatic query suggestions that include a sub-list 802 of entities in accordance with the disclosed architecture. Here, the vertical list of elements 804 shows entity intent as relates to finance books. An entity list 806 is presented that shows a ranked list of three books: Economics, Finance Math Models, and Hedge and Arbitrage Finance Tools (the "Hedge" book item). The user selects the Hedge book item, and as a result, the related and ranked sub-list 802 of entities (books) is presented as a bi-directional scrollable carousel that the user can peruse using one or more gestures (e.g., touch).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
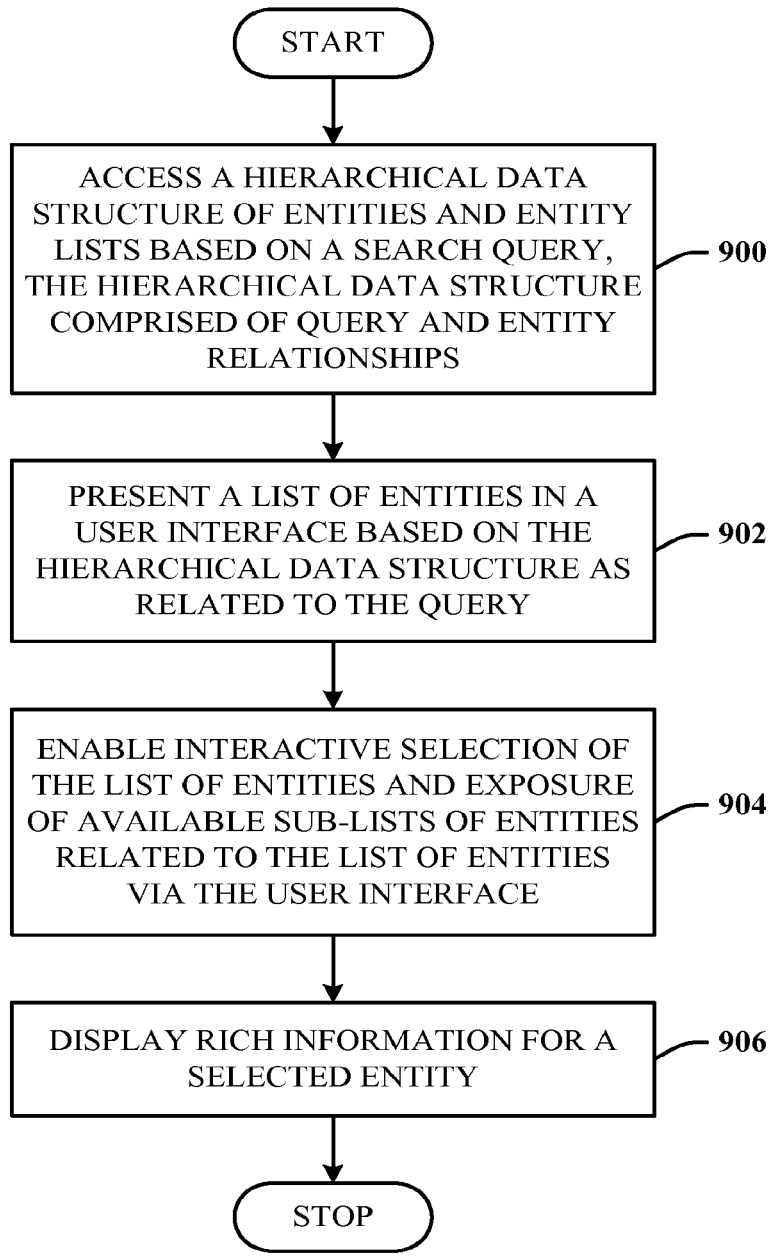
FIG. 9 illustrates a method in accordance with the disclosed architecture.

FIG. 9 illustrates a method in accordance with the disclosed architecture. At 900, a hierarchical data structure of entities and entity lists is accessed based on a search query. The hierarchical data structure is comprised of query and entity relationships, and indexed by query. When the search query is executed by the search engine, the data structure (e.g., a fast lookup table) is accessed according to the query index, and all related lists and sub-lists can be extracted and processed (e.g., cached) by the search engine in anticipation the user will choose to examine search results further.

At 902, a list of entities related to the search is presented in a user interface based on the hierarchical data structure as related to the query. At 904, interactive selection of the list of entities and exposure of available sub-lists of entities related to the list of entities is enabled via the user interface. At 906, rich information (e.g., description, images, videos, news, and search results returned by the search engine) is displayed for a selected entity.

The method can further comprise presenting the entities and entity lists in a ranked format using graphical emphasis and element positioning to indicate ranking. That is, presentation of the entities in a left-to-right manner, for example, can indicate that the highest ranked entity in view is the leftmost entity and the rightmost entity in view is the least ranked of the entities shown (although the rightmost entity is still ranked higher than other entities to the right and currently out of view). As indicative above, coloration gradients can also be employed as a fast visual indication to the user as to rank. The size of the visual element can also be employed as a quick way to represent to the user that one entity is ranked differently than another entity (e.g., a larger visual element means higher rank than a smaller visual element).

The method can further comprise enabling touch-based interactive selection and exposure of the lists of entities and sub-lists of entities via the user interface. When using a touch-based display, touch can readily facilitate scrolling entity lists (sub-lists) and making selections; however, as indicated with NUI interfaces, other modes of communications can be employed such as touch with speech recognition, multi-touch with air-hand gestures, etc.

The method can further comprise computing an entity identifier, relevance score, probability score, and additional query for a given entity intent of the hierarchical data structure. The method can further comprise computing confidence scores for entities of a sub-list and using the confidence scores to rank entities of the sub-list.

The method can further comprise automatically presenting groups of visual interactive elements related to the list of entities, and visual interactive elements related to the sub-lists of entities to indicate the availability of the sub-list of entities for a given entity. The method can further comprise presenting the list of entities as a horizontal scrollable bi-directional row of interactive entities and a sub-list of entities as a vertical scrollable bi-directional column of interactive entities.

Figure 10:
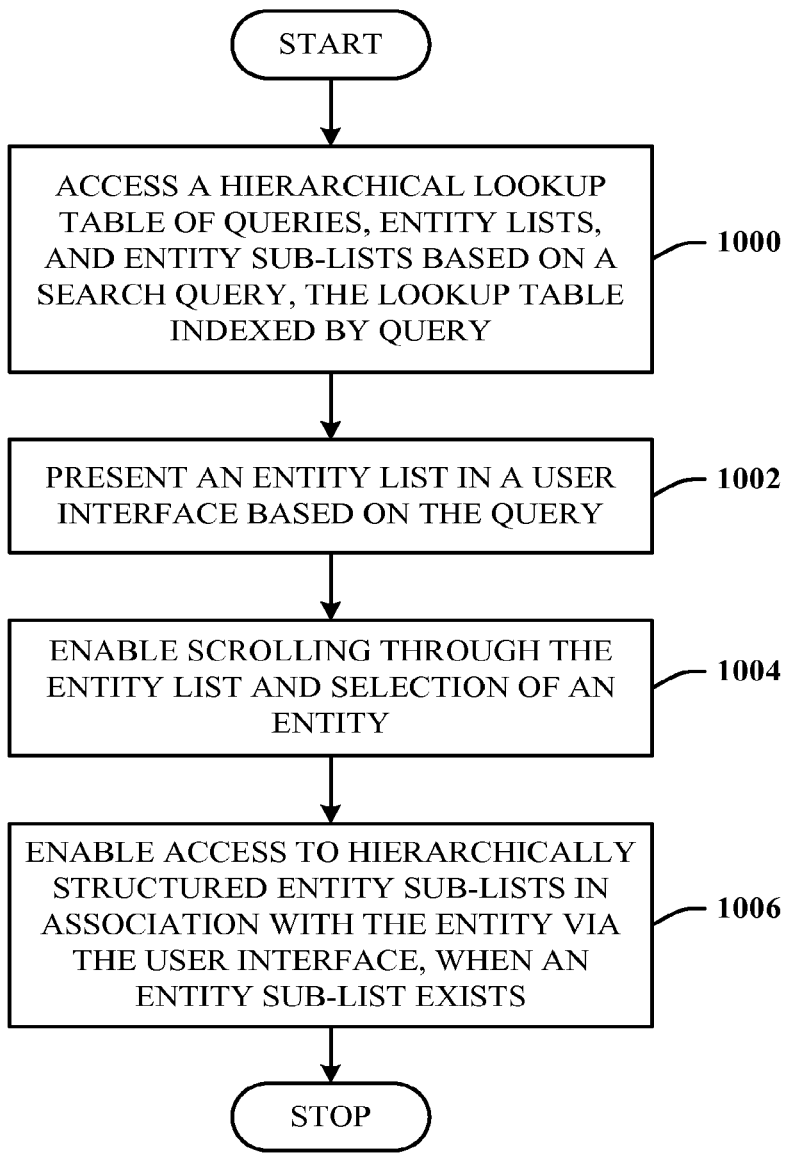
FIG. 10 illustrates an alternative method in accordance with the disclosed architecture.

FIG. 10 illustrates an alternative method in accordance with the disclosed architecture. At 1000, a hierarchical lookup table of queries, entity lists, and entity sub-lists is accessed based on a search query. The lookup table can be indexed by query. At 1002, an entity list is presented in a user interface based on the query. At 1004, scrolling through the entity list and selection of an entity is enabled by the user interface. At 1006, access to hierarchically structured entity sub-lists in association with the entity is enabled via the user interface, when an entity sub-list exists. If there is no further sub-list in the lookup table, no further access is enabled.

The method can further comprise computing and storing in the lookup table an entity identifier, relevance score, probability score, and additional query for a given entity intent related to the query. This information assists in ranking and presentation of the ranked data in the user interface. The method can further comprise computing and storing in the lookup table confidence scores for entities of a sub-list and using the confidence scores to rank entities of the sub-list.

The method can further comprise enabling gesture-based (e.g., touch, speech, and other types of recognition technologies) interactive selection and access of the entity lists and entity sub-lists via the user interface. The method can further comprise automatically presenting a set of visual interactive elements for an entity to indicate presence of an entity sub-list for that entity.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
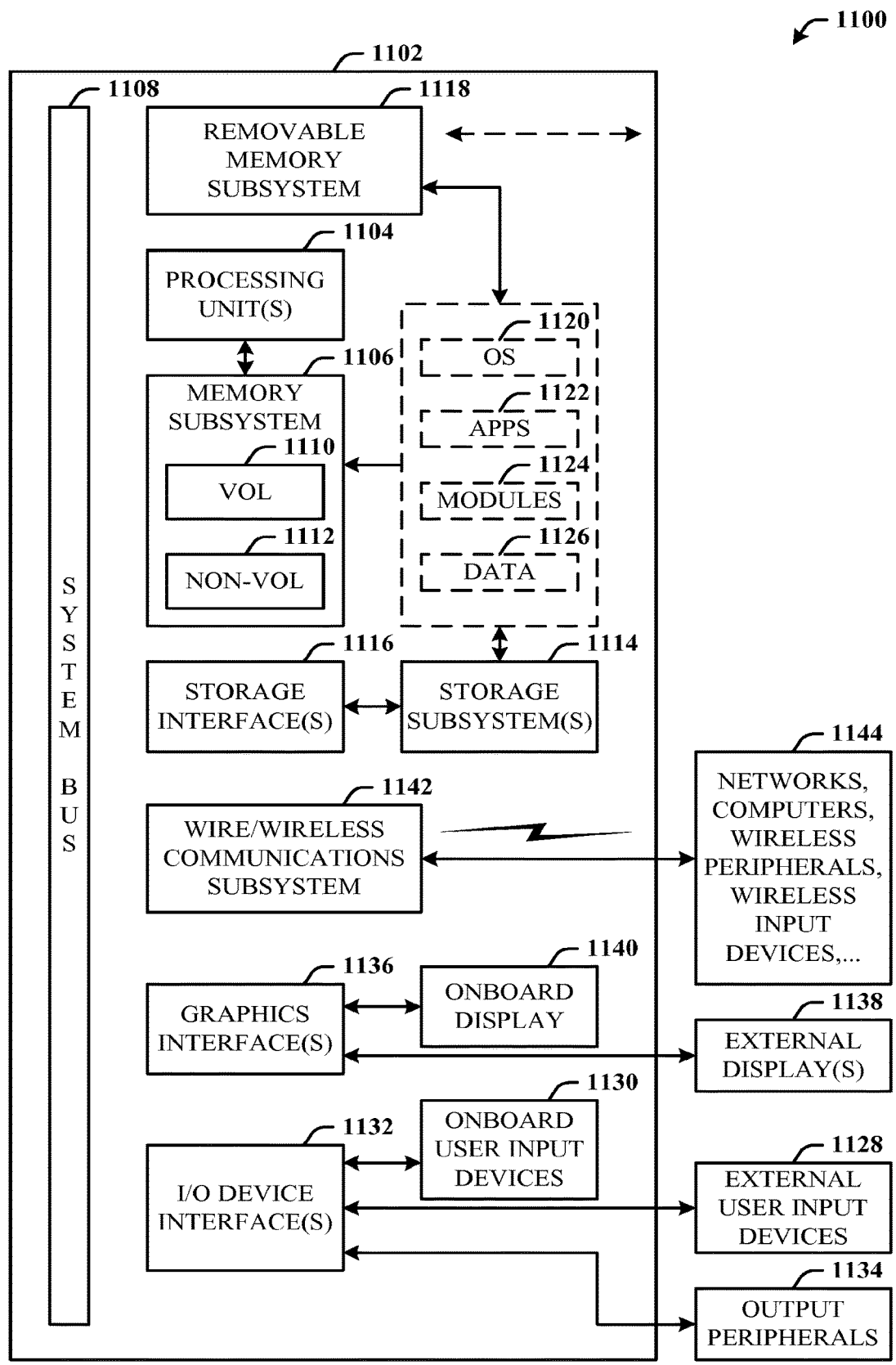
FIG. 11 illustrates a block diagram of a computing system that executes entity extraction and presentation in accordance with the disclosed architecture.

Referring now to FIG. 11, there is illustrated a block diagram of a computing system 1100 that executes entity extraction and presentation in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 11 and the following description are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104 (also referred to as microprocessor(s) and processor(s)), a computer-readable storage medium such as a system memory 1106 (computer readable storage medium/media also include magnetic disks, optical disks, solid state drives, external memory systems, and flash memory drives), and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1102 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1106 can include computer-readable storage (physical storage) medium such as a volatile (VOL) memory 1110 (e.g., random access memory (RAM)) and a non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the system memory 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes machine readable storage subsystem(s) 1114 and storage interface(s) 1116 for interfacing the storage subsystem(s) 1114 to the system bus 1108 and other desired computer components. The storage subsystem(s) 1114 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a machine readable and removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

The operating system 1120, one or more application programs 1122, other program modules 1124, and/or program data 1126 can include components and the system 100 of FIG. 1, the data structure 102 of FIG. 2, components and the UI 300 of FIG. 3, components and the UI view 400 of FIG. 4, components and the UI view 500 of FIGS. 5A and 5B, components and the UI view 600 of FIGS. 6A and 6B, components and the UI view 700 of FIG. 7, components and the UI view 800 of FIG. 8, and the methods represented by the flowcharts of FIGS. 9 and 10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so on. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 1102, and include volatile and non-volatile internal and/or external media that is removable and/or non-removable. For the computer 1102, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1102, programs, and data using external user input devices 1128 such as a keyboard and a mouse, as well as by voice commands facilitated by speech recognition. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example.

These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP-based) using logical connections via a wired/wireless communications subsystem 1142 to one or more networks and/or other computers. The other computers can include workstations, servers, routers, personal computers, microprocessor-based entertainment appliances, peer devices or other common network nodes, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
receiving, through a search user interface, a search query;
evaluating entity relationships associated with the search query using a hierarchical data structure that indexes entity data, by queries, into hierarchical levels that comprise a listing of entities and one or more sub-lists for entities of the listing; and
providing, through the search user interface, a scrollable set of interactive elements presented at a hierarchical level of the hierarchical data structure based on an evaluation of the search query.

2. The method of claim 1, wherein the hierarchical level corresponds with the listing of entities and wherein the scrollable set of interactive elements is associated with entity data of the listing.

3. The method of claim 2, wherein the providing presents the scrollable set of interactive elements in a ranked format and with a graphical emphasis to indicate a ranked order for the entity data of the listing.

4. The method of claim 1, wherein the scrollable set of interactive elements is expandable into scrollable interactive elements for the one or more sub-lists.

5. The method of claim 1, wherein the search user interface is gesture enabled.

6. The method of claim 5, further comprising: receiving, by gesture input through the search user interface, a selection of an interactive element for a sub-list of the one or more sub-lists, and updating the hierarchical level of the scrollable set of interactive elements to present interactive elements associated with the selection of the sub-list.

7. The method of claim 5, further comprising: receiving, by gesture input through the search user interface, a selection of an interactive element for a list item within the one or more sub-lists, and updating the hierarchical level of the scrollable set of interactive elements to present interactive elements associated with the selection of the list item.

8. A system comprising:
at least one processor; and
a memory operatively connected with the at least one processor storing computer-executable instructions that, when executed by the at least one processor, causes the at least one processor to execute a method that comprises:
receiving, through a search user interface, a search query,
evaluating entity relationships associated with the search query using a hierarchical data structure that indexing entity data, by queries, into hierarchical levels that comprise a listing of entities and one or more sub-lists for entities of the listing, and
providing, through the search user interface, a scrollable set of interactive elements presented at a hierarchical level of the hierarchical data structure based on an evaluation of the search query.

9. The system of claim 8, wherein the hierarchical level corresponds with the listing of entities and wherein the scrollable set of interactive elements is associated with entity data of the listing.

10. The system of claim 9, wherein the providing presents the scrollable set of interactive elements in a ranked format and with a graphical emphasis to indicate a ranked order for the entity data of the listing.

11. The system of claim 8, wherein the scrollable set of interactive elements is expandable into scrollable interactive elements for the one or more sub-lists.

12. The system of claim 11, wherein the search user interface is gesture enabled.

13. The system of claim 12, wherein the method, executed by the at least one processor, further comprises: receiving, by gesture input through the search user interface, a selection of an interactive element for a sub-list of the one or more sub-lists, and updating the hierarchical level of the scrollable set of interactive elements to present interactive elements associated with the selection of the sub-list.

14. The system of claim 12, wherein the method, executed by the at least one processor, further comprises: receiving, by gesture input through the search user interface, a selection of an interactive element for a list item within the one or more sub-lists, and updating the hierarchical level of the scrollable set of interactive elements to present interactive elements associated with the selection of the list item.

15. A computer-readable medium storing computer-executable instructions that, when executed by at least one processor, causes the at least one processor to execute a method comprising:
receiving, through a search user interface, a search query;
evaluating entity relationships associated with the search query using a hierarchical data structure that indexes entity data, by queries, into hierarchical levels that comprise a listing of entities and one or more sub-lists for entities of the listing; and
providing, through the search user interface, a scrollable set of interactive elements presented at a hierarchical level of the hierarchical data structure based on an evaluation of the search query.

16. The computer-readable medium of claim 15, wherein the hierarchical level corresponds with the listing of entities and wherein the scrollable set of interactive elements is associated with entity data of the listing.

17. The computer-readable medium of claim 16, wherein the providing presents the scrollable set of interactive elements in a ranked format and with a graphical emphasis to indicate a ranked order for the entity data of the listing.

18. The computer-readable medium of claim 15, wherein the scrollable set of interactive elements is expandable into scrollable interactive elements for the one or more sub-lists.

19. The computer-readable medium of claim 18, wherein the search user interface is gesture enabled, and wherein the executed method further comprising: receiving, by gesture input through the search user interface, a selection of an interactive element for a sub-list of the one or more sub-lists, and updating the hierarchical level of the scrollable set of interactive elements to present interactive elements associated with the selection of the sub-list.

20. The computer-readable medium of claim 18, wherein the search user interface is gesture enabled, and wherein the executed method further comprising: receiving, by gesture input through the search user interface, a selection of an interactive element for a list item within the one or more sub-lists, and updating the hierarchical level of the scrollable set of interactive elements to present interactive elements associated with the selection of the list item.

* * * * *